United States Patent
Oshita et al.

(10) Patent No.: US 12,381,214 B2
(45) Date of Patent: *Aug. 5, 2025

(54) NON-AQUEOUS ELECTROLYTE SECONDARY BATTERY POSITIVE ELECTRODE ACTIVE MATERIAL AND METHOD FOR PRODUCING SAME, AND NON-AQUEOUS ELECTROLYTE SECONDARY BATTERY WHICH USES POSITIVE ELECTRODE ACTIVE MATERIAL

(71) Applicant: SUMITOMO METAL MINING CO., LTD., Tokyo (JP)

(72) Inventors: Hiroko Oshita, Niihama (JP); Kazuomi Ryoshi, Niihama (JP); Taira Aida, Niihama (JP); Koji Yamaji, Niihama (JP); Jiro Okada, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/612,166

(22) Filed: Mar. 21, 2024

(65) Prior Publication Data

US 2024/0266526 A1 Aug. 8, 2024

Related U.S. Application Data

(62) Division of application No. 16/760,130, filed as application No. PCT/JP2018/028590 on Jul. 31, 2018, now Pat. No. 11,967,709.

(30) Foreign Application Priority Data

Oct. 31, 2017 (JP) .................................. 2017-210305
Apr. 27, 2018 (JP) .................................. 2018-086183

(51) Int. Cl.
H01M 4/505 (2010.01)
H01M 4/04 (2006.01)
(Continued)

(52) U.S. Cl.
CPC ......... H01M 4/505 (2013.01); H01M 4/0471 (2013.01); H01M 4/362 (2013.01);
(Continued)

(58) Field of Classification Search
CPC ... C01G 53/00; C01G 53/003; H01M 4/0471; H01M 4/505; H01M 4/366
See application file for complete search history.

(56) References Cited

U.S. PATENT DOCUMENTS 10,249,873 B2   4/2019   Kim
11,605,815 B2*  3/2023   Oshita ................... H01M 4/505
(Continued)

FOREIGN PATENT DOCUMENTS

CN   108028369 A    5/2018
JP   2004-253174 A  9/2004
(Continued)

OTHER PUBLICATIONS

International Search Report mailed Oct. 30, 2018, issued for PCT/JP2018/028590.

*Primary Examiner* — Amanda C. Walke
(74) *Attorney, Agent, or Firm* — Troutman Pepper Locke LLP; James E. Armstrong, IV; Nicholas J. DiCeglie, Jr.

(57) ABSTRACT

The present invention provides a composite oxide that can achieve a high low-temperature output characteristic, a method for manufacturing the same, and a positive electrode active material in which the generation of soluble lithium is suppressed and a problem of gelation is not caused during the paste preparation. A positive electrode active material for non-aqueous electrolyte secondary batteries, including a
(Continued)

lithium-metal composite oxide powder including a secondary particle configured by aggregating primary particles containing lithium, nickel, manganese, and cobalt, or a lithium-metal composite oxide powder including both the primary particles and the secondary particle, wherein the secondary particle has a hollow structure inside as a main inside structure, the slurry pH is 11.5 or less, the soluble lithium content rate is 0.5 [% by mass] or less, the specific surface area is 2.0 to 3.0 [m$^2$/g], and the porosity is 20 to 50 [%].

9 Claims, 4 Drawing Sheets

(51) Int. Cl.
  *H01M 4/36* (2006.01)
  *H01M 4/525* (2010.01)
  *H01M 10/0525* (2010.01)
  *H01M 4/02* (2006.01)

(52) U.S. Cl.
  CPC ........... *H01M 4/366* (2013.01); *H01M 4/525* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 11,784,310 B2* | 10/2023 | Oshita | H01M 4/505 429/223 |
| 2007/0231694 A1 | 10/2007 | Abe et al. | |
| 2012/0183850 A1 | 7/2012 | Yamaguchi et al. | |
| 2012/0300365 A1 | 11/2012 | Lee et al. | |
| 2013/0078520 A1 | 3/2013 | Toya | |
| 2014/0011090 A1 | 1/2014 | Toya | |
| 2017/0110726 A1 | 4/2017 | Aida et al. | |
| 2017/0288223 A1 | 10/2017 | Ogawa | |
| 2018/0261873 A1 | 9/2018 | Yamaji et al. | |

FOREIGN PATENT DOCUMENTS

| | | | | |
|---|---|---|---|---|
| JP | 2007-273106 A | 10/2007 | | |
| JP | 2011-70994 A | 4/2011 | | |
| JP | 2012-248826 A | 12/2012 | | |
| JP | 2013-125732 A | 6/2013 | | |
| JP | 2014-67546 A | 4/2014 | | |
| JP | 2014-143063 A | 8/2014 | | |
| JP | 2015-56368 A | 3/2015 | | |
| JP | 2017-134996 A | 8/2017 | | |
| WO | WO-2014061579 A1 * | 4/2014 | ............. | C01G 53/00 |
| WO | 2015/146598 A1 | 10/2015 | | |
| WO | 2017/090378 A1 | 6/2017 | | |

* cited by examiner

FIG.2

PREPARATION OF RAW MATERIAL SOLUTION
BY MIXING $NiSO_4 \cdot 6H_2O$ + $MnSO_4 \cdot H_2O$ + $CoSO_4 \cdot 7H_2O$ + WATER AFTER HEATING REACTION TANK HAVING SMALL AMOUNT OF WATER PUT THEREINSIDETO 40°C/40°C TO 60°C, IN ATMOSPHERE
($O_2$: 21%/OXIDIZING ATMOSPHERE)

SUPPLYING RAW MATERIAL SOLUTION + $NH_3$ WATER + NaOH (ALKALINE AQUEOUS SOLUTION) WHILE WATER IN REACTIONTANK IS STIRRED
TO FORM REACTION SOLUTION

CRYSTALLIZATION TREATMENT WHILE pH IS MAINTAINED TO 11.7/11.0
TO 12.5 (AT STANDARD LIQUID TEMPERATURE OF 25°C)
AND $NH_4^+$ CONCENTRATION IS MAINTAINED TO 10/5 TO 30 [g/L]
(SUPPLYING NaOH: ALKALINE SOLUTION AND AMMONIA WATER)
(CRYSTALLIZATION TIME: 0.5/0.5 HOUR OR LESS)

STOPPING SUPPLYING LIQUID

REPLACING $O_2$ CONCENTRATION IN REACTION TANK BY 0.2% BY VOLUME
OR LESS (REPLACING BY INERT GAS/$N_2$)

RESTARTING SUPPLYING LIQUID AT $O_2$ CONCENTRATION OF 0.2% BY VOLUME OR LESS

CRYSTALLIZATION TREATMENT (WHILE pH AND $NH_4^+$ ARE MAINTAINED)
(CRYSTALLIZATION TIME: 3.5/0.5 TO 3.5 HOURS)

COMPLETING CRYSTALLIZATION TREATMENT WITHIN "4/4 HOURS OR LESS"
OF TOTAL CRYSTALLIZATION TIME

FORMING NiMnCo COMPOSITE HYDROXIDE (HOLLOW STRUCTURE)

CONDITION NOTE (FOR EXAMPLE, pH OF 11.7/11.0 TO 12.5
(AT STANDARD LIQUID TEMPERATURE OF 25°C)
REPRESENTS "CONDITION IN EXAMPLES/PREFERABLE RANGE"

NON-AQUEOUS ELECTROLYTE SECONDARY BATTERY POSITIVE ELECTRODE ACTIVE MATERIAL AND METHOD FOR PRODUCING SAME, AND NON-AQUEOUS ELECTROLYTE SECONDARY BATTERY WHICH USES POSITIVE ELECTRODE ACTIVE MATERIAL

CROSS REFERENCE TO RELATED APPLICATIONS

This application is a Divisional of U.S. patent application Ser. No. 16/760,130, filed Apr. 29, 2020, which Applications is a U.S. 371 National Phase Applications of International PCT Patent Application No. PCT/JP2018/028590, filed Jul. 31, 2018, which application claims priority to Japanese Patent Application No. JP 2018-086183, filed Apr. 27, 2018, and Japanese Patent Application No. JP 2017-210305, filed Oct. 31, 2017. The entire contents of these applications are incorporated herein by reference in their entirety.

TECHNICAL FIELD

The present invention relates to a positive electrode active material for non-aqueous electrolyte secondary batteries, a method for manufacturing the positive electrode active material, and non-aqueous electrolyte secondary batteries in which the positive electrode active material is used.

BACKGROUND ART

With the recent spread of portable electronic devices such as smartphones, tablet terminals, and laptop computers, it has been increasingly needed to develop high output secondary batteries such as small and light non-aqueous electrolyte secondary batteries having high energy density and batteries for hybrid vehicles and electric cars.

Examples of the secondary battery that can meet these needs include a lithium ion secondary battery. A lithium ion secondary battery is composed of a positive electrode, a negative electrode, an electrolyte solution, and the like, and the active materials of the positive electrode and the negative electrode include a material in which lithium extraction/insertion is possible. Lithium ion secondary batteries are still being actively researched and developed. Among them, lithium ion secondary batteries including a layered or spinel lithium-metal composite oxide used in the positive electrode material are being put to practical use as batteries having a high energy density since a high voltage of approximately 4 V can be obtained.

Examples of the positive electrode materials that have been mainly proposed include a lithium-cobalt composite oxide ($LiCoO_2$) that is relatively easily synthesized, a lithium-nickel composite oxide using nickel that is more inexpensive than cobalt ($LiNiO_2$), a lithium-nickel-manganese-cobalt composite oxide ($LiNi_{1/3}Mn_{1/3}CO_{1/3}O_2$), and a lithium-manganese composite oxide ($LiMn_2O_4$) using manganese.

Among them, the lithium-nickel-manganese-cobalt composite oxide has been attracting attention as a material capable of obtaining a good cycle characteristic of a battery capacity, low resistance, and high output, and has been recently considered important for an in-vehicle power supply, since the composite oxide is also suitable for a power supply for electric cars and hybrid vehicles that have limited space for mounting.

As a technique for realizing a further high output with such a positive electrode material, for example, Patent Literature 1 proposes a technique in which fine particles containing tungsten and lithium are formed on the surface of primary particles included in a lithium-metal composite oxide to reduce the positive electrode resistance and to improve the output characteristic of a battery. However, tungsten has a high scarcity value and belongs to the rare metal, so that the cost of the positive electrode active material containing tungsten tends to increase.

Patent Literature 2 proposes water washing of a lithium-metal composite oxide. Since excessive lithium unreacted with the metal composite hydroxide is washed away, the initial discharge capacity and the thermal stability are improved. However, there is a defect that the surface of the lithium-metal composite oxide is damaged by the water washing and the required lithium is eluted to deteriorate the output characteristic.

Patent Literature 3 proposes a positive electrode active material for non-aqueous electrolyte secondary batteries, the positive electrode active material including particles having an average particle size of 0.05 to 1.0 [μm], containing a positive electrode active material having a tap density (TD) of 0.8 to 3.0 [$g/cm^3$], and containing 5 to 20 parts by weight of a conductive agent, 0.5 to 10 parts by weight of a binder, and 10 to 120 parts by weight of a solvent, based on 100 parts by weight of the positive electrode active material powder. By using such fine particles as the positive electrode active material powder, it is possible to increase the specific surface area corresponding to the reaction area with the electrolyte solution and to improve the output characteristic. However, it is necessary to add a large amount of a conductive assistant in proportion to the specific surface area to secure the conductivity, and the energy density is accordingly reduced, so that it is required to develop a technique for solving the problem.

Additionally, Patent Literature 4 proposes, as a technique for increasing the specific surface area and improving the output characteristic, a positive electrode active material having a surface with a porous structure and a specific surface area of 1,800 to 2,500 [$m^2/g$], and being subjected to a thermal treatment at a temperature of 700 [° C.] or less.

However, when the thermal treatment temperature is low, the reactivity between the lithium source and the metal hydroxide is also decreased, the unreacted excessive lithium is increased, and the crystallinity of the positive electrode active material is deteriorated, so that the required lithium is easily eluted from the positive electrode active material itself. As a result, there is concern that dissolution of lithium in the solvent may cause gelation during the paste preparation of the positive electrode active material and the yield is reduced. The cause of the gelation is largely related to the increase in the pH, the salt concentration, and the viscosity due to the dissolution of lithium in the solvent, and thought to be that these factors cause the deterioration of the binding agent (binder) such as polyvinylidene fluoride (PVDF).

In conventional techniques as described above, there is still a problem to be solved, in order to satisfy the high output characteristic required in a positive electrode active material for non-aqueous electrolyte secondary batteries, and to suppress the gelation during the paste preparation of the positive electrode active material.

CITATION LIST

Patent Literature

Patent Literature 1: JP 2013-125732 A
Patent Literature 2: JP 2007-273106 A
Patent Literature 3: JP 2011-070994 A
Patent Literature 4: JP 2012-248826 A

SUMMARY OF INVENTION

Technical Problem

The present invention provides a "lithium-metal composite oxide" used in a "positive electrode active material" and a method for manufacturing the lithium-metal composite oxide. In the lithium-metal composite oxide, the reactivity between the lithium raw material and the metal composite hydroxide is improved so that a lithium ion secondary battery incorporating the positive electrode active material can achieve a high output characteristic at a low temperature without a water washing treatment. (Note that the "lithium-metal composite oxide" is used as the "positive electrode active material". Here, the term "positive electrode active material" has a broader meaning, and the term "lithium-metal composite oxide" has a narrower meaning.) Furthermore, the present invention provides a high-performance positive electrode active material that does not cause a problem of gelation during the paste preparation because of suppressing the generation of soluble lithium that is easily eluted from the positive electrode active material itself owing to the increase of unreacted excessive lithium and lithium that is easily eluted due to the deterioration of the crystallinity of the positive electrode active material and the like.

Solution to Problem

In order to solve the above-mentioned problem, the present inventors have intensively studied the powder characteristic of a lithium-metal composite oxide used as a positive electrode active material for non-aqueous electrolyte secondary batteries, and the influence of the lithium-metal composite oxide on the charge and discharge characteristic of a battery incorporating the lithium-metal composite oxide. As a result, the present inventors have found a technique of pulverizing a lithium compound powder as a lithium raw material to an optimum particle size before the mixing and the firing in the manufacturing process of a lithium-metal composite oxide. The present inventors have found that, by using the pulverized fine powder lithium compound, a positive electrode active material is obtained that does not undergo abnormal particle growth while retaining the reactivity with a metal composite hydroxide powder when firing, and completed the present invention. The present invention provides such an excellent positive electrode active material that a lithium ion secondary battery incorporating the positive electrode active material can achieve a high output characteristic at a low temperature without performing the water washing treatment, the generation of soluble lithium is suppressed, and gelation is not caused during the paste preparation.

A first invention of the present invention based on the findings described above is a positive electrode active material for non-aqueous electrolyte secondary batteries, the positive electrode active material including a lithium-metal composite oxide powder including a secondary particle configured by aggregating primary particles containing lithium, nickel, manganese, and cobalt, or a lithium-metal composite oxide powder including both the primary particles and the secondary particle, wherein the secondary particle has a hollow structure inside as a main inside structure, a mixed slurry being a mixture of water and the lithium-metal composite oxide powder as a slurry solid body component has a pH of 11.5 or less at a time when the mixed slurry contains the lithium-metal composite oxide at a slurry concentration of 50 [g/L], the lithium-metal composite oxide powder contains soluble lithium at a content rate of 0.5 [% by mass] or less, the lithium-metal composite oxide powder has a specific surface area of 2.0 to 3.0 [m$^2$/g], and the secondary particle has a porosity of 20 to 50 [%].

A second invention of the present invention is a positive electrode active material for non-aqueous electrolyte secondary batteries, in which the lithium-metal composite oxide powder described in the first invention is represented by a general formula: $Li_a(Ni_{1-w-x}Mn_wCo_x)_{1-y}M_yO_2$: ($0.98 \leq a \leq 1.20$, $0.01 \leq w \leq 0.50$, $0.01 \leq x \leq 0.50$, $0.01 \leq y \leq 0.10$, where M is one or more of Mg, Al, Ti, Fe, Cu, Si, Zn, Mo).

A third invention of the present invention is a positive electrode active material for non-aqueous electrolyte secondary batteries, wherein the lithium-metal composite oxide powder described in the first or the second invention has a particle strength of 150 to 180 MPa.

A fourth invention of the present invention is a non-aqueous electrolyte secondary battery including a positive electrode including the positive electrode active material for non-aqueous electrolyte secondary batteries described in the first to the third inventions, wherein $\Delta V_{-20\ [°C.]}$ determined by a current rest method is 0.55 [V] or less at −20 [° C.].

A fifth invention of the present invention is a positive electrode mixture paste for non-aqueous electrolyte secondary batteries, the positive electrode mixture paste including: a solid component; and a solvent, in which the solid component contains the positive electrode active material for non-aqueous electrolyte secondary batteries described in the first to the third inventions, and the positive electrode mixture paste has a viscosity of 5,000 [mPa·s] or less at 20 [° C.] at a time when the solid component and the solvent have a mass ratio of the solid component [g]/the solvent [g]=1.875.

A sixth invention of the present invention is a method for manufacturing a positive electrode active material for non-aqueous electrolyte secondary batteries, the method including:

a filtration and washing process (A) of washing a metal composite hydroxide with water, or with an alkali and then with water, and collecting a residual material of the metal composite hydroxide by a solid-liquid separation;

a drying process (B) of obtaining a dried material of the metal composite hydroxide by drying the residual material;

a mixing process (C) of forming a mixture of the dried material and a fine powder lithium compound having a maximum particle size of 10 [μm] or less; and a firing process (D) of forming a positive electrode active material for non-aqueous electrolyte secondary batteries, the positive electrode active material including a lithium-metal composite oxide as a fired body by firing the mixture, in which a lithium-metal composite oxide powder is manufactured with the metal composite hydroxide containing nickel, manganese, and cobalt and the fine powder lithium compound having a maximum particle size of 10 [μm] or less as raw materials using a manufacturing process including the processes (A) to (D) in order described above, the lithium-metal composite oxide powder includes a secondary particle configured by aggregating primary particles containing lithium, nickel, manganese, and cobalt or includes both the primary particles and the secondary particle, the secondary particle has a hollow structure inside as a main inside structure, the lithium-metal composite oxide powder has a porosity of 20 to 50 [%], a slurry has a pH of 11.5 or less at a time when a slurry concentration is 50 [g/L], the lithium-metal composite oxide powder contains 0.5 [% by mass] of soluble lithium, and the lithium-metal composite oxide powder has a specific surface area of 2.0 to 3.0 [m$^2$/g].

A seventh invention of the present invention is a method for manufacturing a positive electrode active material for non-aqueous electrolyte secondary batteries, in which the metal composite hydroxide described in the sixth invention is produced by a preparing process (a) described below, and the metal composite hydroxide has a coarse density of 20 to 50 [%]:

a preparing process (a) for producing a metal composite hydroxide, the preparing process of stirring water having a water surface in an oxidizing atmosphere and having a maintained temperature of 40 to 60 [° C.]; forming a reaction solution by adding a nickel-manganese-cobalt mixed solution, ammonia water, and an alkaline solution to the water while the water is stirred; performing a crystallization treatment in a state where the reaction solution has a maintained pH of 11.0 to 12.5; performing a crystallization treatment in the reaction solution having a liquid surface in an inert atmosphere or in a non-oxidizing atmosphere having a controlled oxygen concentration of 0.2 [% by volume] or less; and crystallizing a metal composite hydroxide having a controlled coarse density of 20 to 50 [%].

An eighth invention of the present invention is a method for manufacturing a positive electrode active material for non-aqueous electrolyte secondary batteries, in which a lithium raw material of the fine powder lithium compound described in the sixth or the seventh invention, the lithium raw material before pulverized is a lithium compound powder having a maximum particle size of 100 [μm] or more and an average particle size of 50 [μm] or more.

A ninth invention of the present invention is a method for manufacturing a positive electrode active material for non-aqueous electrolyte secondary batteries, in which the fine powder lithium compound described in the sixth to the eighth inventions has a maximum particle size of 10 [μm] or less and an average particle size of 5.0 [μm] or less, and the fine powder lithium compound is formed using a pulverizing process (p) described below:

a pulverizing process (p) of producing a fine powder lithium compound having a maximum particle size of 10 [μm] or less and an average particle size of 5.0 [μm] or less by pulverizing a lithium compound powder being a lithium raw material having a maximum particle size of 100 [μm] or more and an average particle size of 50 [μm] or more.

A tenth invention of the present invention is a method for manufacturing a positive electrode active material for non-aqueous electrolyte secondary batteries, in which the lithium raw material described in the eighth or the ninth invention is lithium carbonate, lithium hydroxide, or a mixture of the lithium carbonate and the lithium hydroxide.

An eleventh invention of the present invention is a method for manufacturing a positive electrode active material for non-aqueous electrolyte secondary batteries, in which the lithium-metal composite oxide powder described in the sixth to the tenth inventions is represented by a general formula: $Li_a(Ni_{1-w-x}Mn_wCo_x)_{1-y}M_yO_2$: (0.98≤a≤1.20, 0.01≤w≤0.50, 0.01≤x≤0.50, 0.01≤y≤0.10, where M is one or more of Mg, Al, Ti, Fe, Cu, Si, Zn, Mo).

A twelfth invention of the present invention is a method for evaluating a characteristic of a positive electrode active material for non-aqueous electrolyte secondary batteries, the characteristic being a "slurry pH" indicating a pH of a slurry containing water and the positive electrode active material as a solid body component, the method including: by adding the positive electrode active material to the water so that the slurry contains the positive electrode active material at a concentration of 50 [g/L]; maintaining a state where the slurry is stirred for 30 minutes; and obtaining the slurry pH by measuring the pH of the slurry with a "pH meter" in the state where the slurry is stirred.

A thirteenth invention of the present invention is a method for evaluating a characteristic of a positive electrode active material for non-aqueous electrolyte secondary batteries, the positive electrode active material for non-aqueous electrolyte secondary batteries containing lithium, the characteristic being a "soluble lithium content rate" indicating a lithium amount contained in the positive electrode active material soluble in water being a liquid component of a slurry containing the positive electrode active material and the water, the method including: adding the positive electrode active material to the water so that the slurry contains the positive electrode active material at a concentration of 20 [g/L]; maintaining a state where the slurry is stirred for 10 minutes; filtering the slurry; and obtaining the soluble lithium content rate by measuring the lithium contained in an obtained filtrate with an ICP optical emission spectrometer.

A fourteenth invention of the present invention is a method for evaluating a characteristic of a positive electrode active material for non-aqueous electrolyte secondary batteries, the characteristic being a porosity representing a measure of an amount of an internal space of the positive electrode active material, the method including: a first process of embedding a lithium-metal composite oxide in a resin; a second process of exposing a cross section of a particle of the lithium-metal composite oxide embedded in the resin by cutting the particle using a cross-section polisher by argon sputtering; a third process of observing the exposed cross section of the particle using a scanning electron microscope; and a fourth process of determining a porosity by analyzing an image of the observed cross section of the particle with image analysis software so that a void of the image is analyzed as a black part and a dense portion is analyzed as a white part and calculating an area ratio of the black part/(the black part+the white part) for the cross section of any 20 or more of the particles.

Advantageous Effects of Invention

The present invention provides a positive electrode active material for non-aqueous electrolyte secondary batteries that is obtained through a process of mixing a metal composite hydroxide and a fine powder lithium compound produced by pulverizing a lithium compound powder as a lithium raw material so that the maximum particle size is 10 [μm] or less and the average particle size is 5.0 [μm] or less, and of firing the mixture, the positive electrode active material so excellent that a lithium ion secondary battery incorporating the positive electrode active material can achieve a high output characteristic at a low temperature without water washing, the generation of soluble lithium is suppressed, and gelation is not caused during the paste preparation. Therefore, the industrial significance of the present invention is extremely large.

BRIEF DESCRIPTION OF DRAWINGS

FIG. 2 is a process flowchart in a method for manufacturing a metal composite hydroxide according to the present embodiment.

DESCRIPTION OF EMBODIMENTS

One embodiment of the present invention will be described below.

The present embodiment is not limited to the description below, and can be modified without departing from the scope of the present invention.

Figure 1:
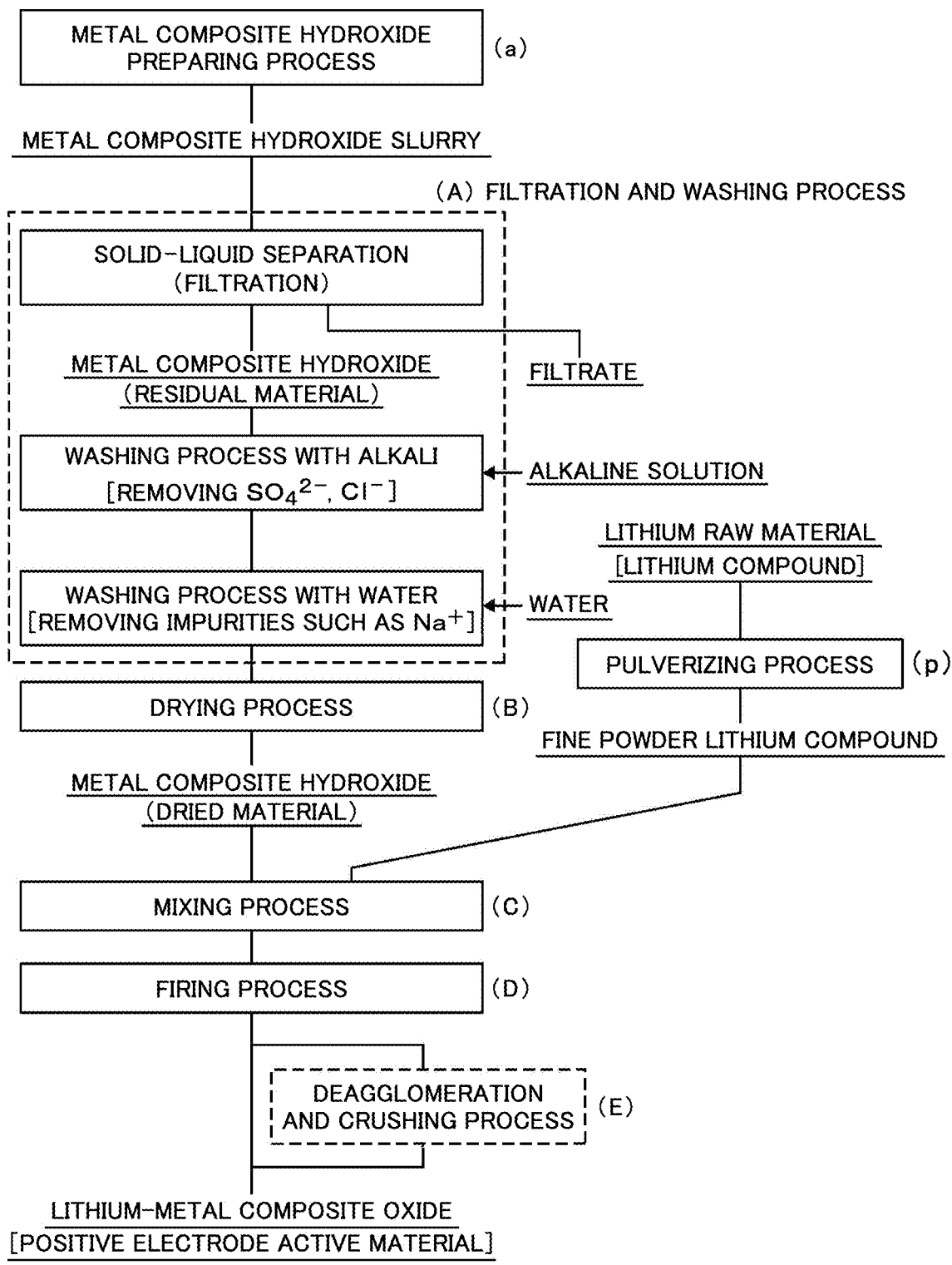
FIG. 1 is a process flowchart in a method for manufacturing a positive electrode active material according to the present embodiment.

FIG. 1 is a process flowchart in a method for manufacturing a positive electrode active material according to the present embodiment. The following description of the method for manufacturing will be made in accordance with the process flow shown in FIG. 1.

<Preparing Process (a) of Metal Composite Hydroxide>

FIG. 2 is a process flow chart in the method for producing a metal composite hydroxide according to the present embodiment.

First, a nickel-manganese-cobalt mixed solution as a raw material solution prepared by mixing of aqueous solutions of nickel, manganese, cobalt, and if necessary a metal compound such as an M element compound (preferably, the aqueous solution prepared using a hydrate), an alkaline solution that is used for pH adjustment (such as an aqueous sodium hydroxide solution), and ammonia water that is used for ammonia concentration ($NH_4^+$) adjustment are prepared.

Next, in the manufacturing of the metal composite hydroxide according to the present embodiment, water (preferably, pure water such as ion-exchanged water in which impurities are controlled) was put into a reaction tank in an oxidizing atmosphere (that preferably has an oxygen concentration of more than 21 [% by volume] and may be typically the atmosphere) controlled to be in the temperature range of 40 to 60 [° C.] by heating, the raw material solution and the ammonia water were supplied at a constant rate to form a reaction solution while the inside of the reaction tank was stirred with a stirrer so that the liquid temperature was in the range of 40 to 60 [° C.] and while the supply amount of an alkaline solution was controlled so that the pH of the water (at a standard liquid temperature of 25 [° C.]) was in the range of 11.0 to 12.5, and the treatment was performed from the start of the crystallization in the range of 0.5 hour to produce a metal composite hydroxide. The liquid supply was stopped after the crystallization was completed.

Then, the atmosphere in the reaction tank is changed from the oxidizing atmosphere to an inert atmosphere or a non-oxidizing atmosphere having a controlled oxygen concentration of 0.2 [% by volume] or less, the liquid supply is restarted, and the crystallization treatment is continued for 0.5 to 3.5 hours to control the coarse density of the obtained metal composite hydroxide to 20 to 50 [%], so that a nickel-manganese-cobalt composite hydroxide having a hollow structure is manufactured.

As described above, by setting the atmosphere in the reaction tank to an oxidizing atmosphere (the atmosphere), an inert atmosphere, or a non-oxidizing atmosphere in which the oxygen concentration is controlled to 0.2 [% by volume] or less, the coarse density of the obtained metal composite hydroxide powder is controlled.

Here, when the temperature in the reaction tank is less than 40 [° C.], the particle size of the generated metal composite hydroxide is too large, and when the temperature is more than 60 [° C.], the particle size of the metal composite hydroxide is too small. Such a particle size is undesirable because of its influence on a lithium-metal composite oxide manufactured in the subsequent process. When the pH in the reaction tank at the beginning of forming the reaction solution is less than 11.0, the concentration of the sulfate remaining in the positive electrode active material is high and the output characteristic of a battery incorporating the positive electrode active material is deteriorated, so that such a pH is undesirable. When the pH is more than 12.5, the particle size is too small, so that such a pH is undesirable. The crystallization treatment can be stabilized by controlling the ammonia concentration ($NH_4^+$) in the range of 5 to 30 [g/L], preferably in the range of 10 to 20 [g/L].

When the coarse density of the obtained metal composite hydroxide is less than 20 [%], a particle having a hollow structure cannot be obtained, and when the coarse density is more than 50 [%], the obtained metal composite hydroxide cannot maintain the strength as a particle having a hollow structure and is easily crushed in the subsequent manufacturing process, so that a desired positive electrode active material is not obtained.

The coarse density can be measured by observing the cross sectional structure of the obtained metal composite hydroxide particles using a scanning electron microscope (SEM). Specifically, for the evaluation of the coarse density, the cross sectional area of the particles and the void area inside the particles are determined using image analysis software and the coarse density is calculated by a formula of "(void area inside particles)/(cross sectional area of particles)×100 [%]".

When applied to the secondary particle according to the present embodiment, the term "coarse density" means a value that is obtained from the result of the image analysis of the cross section of the obtained metal composite hydroxide particles using a scanning electron microscope and image analysis software, and is represented by a formula of "(void area inside secondary particle/cross sectional area of secondary particle)×100 [%]".

Figure 3:
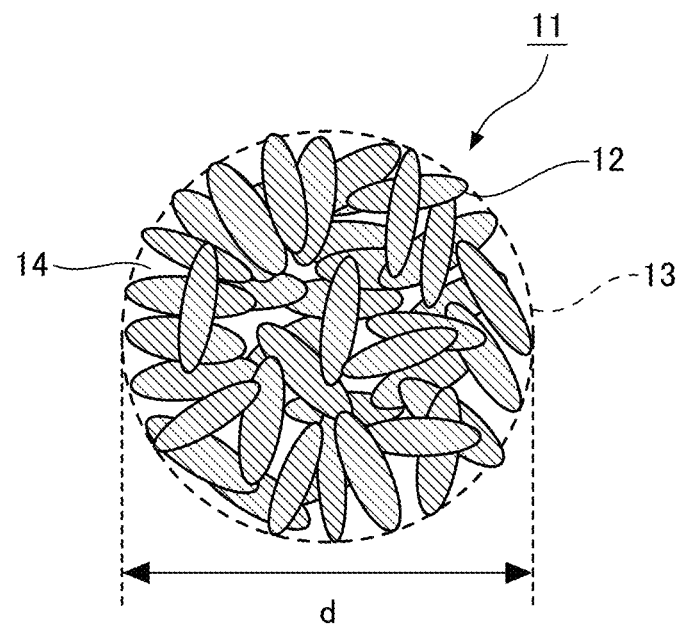
FIG. 3 is a schematic cross sectional view of metal composite hydroxide particles 11 according to the present embodiment.

For example, in the cross section of composite hydroxide particles 11 having a particle size d shown in FIG. 3, the coarse density is a value represented by "(area of void 14)/(sum of cross sectional area of primary particles 12 and area of void 14)×100". That is, the higher the coarse density is, the coarser the structure inside a secondary particle 13 is, and the lower the coarse density is, the denser the structure inside the secondary particle 13 is.

Specifically, 20 cross sections of the secondary particle 13 having a particle size of 80 [%] or more of the volume average particle diameter (MV) are randomly selected, the coarse densities of the cross sections of the secondary particle 13 are measured, and the average value (average coarse density) is calculated.

<Filtration and Washing Process (A) • Drying Process (B)>

In a filtration and washing process (A), the reaction solution after the crystallization treatment is filtered to separate the residual material of the crystallized metal composite hydroxide from the filtrate. In the process, the obtained residual material of the metal composite hydroxide is washed with an alkali using an alkaline solution such as a sodium hydroxide solution to remove a sulfate ion ($SO_4^{2-}$), a chlorine ion ($Cl^-$), and the like contained in the metal composite hydroxide, and then washed again with pure water such as ion-exchanged water in which impurities are controlled to remove impurities such as a sodium ion ($Na^+$), so that the metal composite hydroxide being a washed residual material is obtained through the water washing.

Furthermore, the metal composite hydroxide being a washed residual material is put in a dryer and dried at a temperature in the range of 100 to 150 [° C.] to obtain a dried material of the metal composite hydroxide dry powder.

<Pulverizing Process (p) of Lithium Compound Powder>

This is a process of finely pulverizing a lithium compound powder having a maximum particle size of 100 [μm] or more as a lithium raw material. The reason for using a lithium compound powder having a maximum particle size of 100 [μm] or more as a lithium raw material is that such a lithium compound powder is pulverized to a powder having many new surfaces that are not under an influence of surface deterioration due to moisture absorption and the like, so that a fine powder lithium compound can be obtained having an increased contact surface and reactivity with the metal composite hydroxide. Another reason is that a battery incorporating the lithium-metal composite oxide manufactured through a mixing and firing process as a positive electrode active material has an improved low-temperature output characteristic.

The pulverized fine powder lithium compound preferably has a maximum particle size of 10.0 [μm] or less, and more preferably 8.0 [μm] or less. Furthermore, the average particle size is preferably 5.0 [μm] or less, and more preferably 3.5 [μm] or less. When the maximum particle size is more than 10.0 [μm] or the average particle size is more than 5.0 [μm], the reactivity is decreased between the fine powder lithium compound and the mixed metal composite hydroxide when firing, and the low-temperature output characteristic is deteriorated of a battery incorporating the manufactured lithium-metal composite oxide as a positive electrode active material.

In the pulverizing, a general pulverizer can be used. For example, a jet mill or a ball mill can be used, and the pulverization condition is set so that the maximum particle size is 10.0 [μm] or less. After the pulverizing, a powder having a particle size of more than 10.0 [μm] may be removed by sieving to obtain the fine powder lithium compound having a predetermined particle size. The lower limit of the particle size is not particularly limited, and in consideration of the performance of the pulverizer, the average particle size is about 0.1 [μm].

For the confirmation of the maximum particle size and the average particle size, a laser diffraction/scattering type particle size distribution measuring device can be used. In the measurement with the measuring device, the particle size is measured by a laser diffraction/scattering method with a circulating slurry obtained by adding a liquid to a sample to be measured, and the circulating slurry is irradiated with an ultrasonic wave for the deagglomeration of the secondary particle, so that almost all the particles to be measured are primary particles.

The lithium compound powder is not particularly limited, and lithium compounds can be used such as lithium carbonate ($Li_2CO_3$: melting point 723 [° C.]), lithium hydroxide (LiOH: melting point 462 [° C.]), lithium nitrate ($LiNO_3$: melting point 261 [° C.]), lithium chloride (LiCl: melting point 613 [° C.]), and lithium sulfate ($Li_2SO_4$: melting point 859 [° C.]). Lithium carbonate or lithium hydroxide is particularly preferably used in consideration of the ease of the handling and the quality stability.

<Mixing Process (C) and Firing Process (D)>

The fine powder lithium compound obtained by pulverizing the lithium compound powder as a lithium raw material in the pulverizing process (p) and the dry powder of the metal composite hydroxide obtained through the drying process (B) are mixed in a mixing process (C).

The fine powder lithium compound and the metal composite hydroxide powder are mixed so that the ratio of the sum of the numbers of nickel, manganese, and cobalt atoms and the number of lithium atoms is in the range of 1.00 to 1.20 in the lithium-metal composite oxide. When the ratio is less than 1.00, lithium atoms are not incorporated into the lithium site, 3a site, so that a battery incorporating the manufactured lithium-metal composite oxide as a positive electrode active material cannot achieve the target battery characteristic.

The term "site" refers to a crystallographically equivalent lattice position. A case where an atom is present at a lattice position is referred to as a case where "a site is occupied", and the site is called an occupied site. For example, $LiCoO_2$ has three occupied sites that are called a lithium site, a cobalt site, and an oxygen site, or also called a 3a site, a 3b site, and a 6c site. When the ratio is more than 1.20, the sintering is promoted and the particle size and the crystallite diameter are too large, so that the cycle characteristic is deteriorated.

Next, the mixture of the fine powder lithium compound and the metal composite hydroxide powder (hereinafter also referred to as the lithium mixture) is subjected to a firing process (D) of firing at a temperature in the range of 800 to 950 [° C.] in the atmosphere.

When the firing temperature of this firing is less than 800 [° C.], satisfactory battery characteristic cannot be obtained because the reactivity is reduced and unreacted excessive lithium is increased in the obtained lithium-metal composite oxide, or the crystallinity and the like is deteriorated owing to the insufficiently adjusted crystal structure and the required lithium is easily eluted from the positive electrode active material itself. The tendency is particularly remarkable when a mixed slurry being a mixture of water and the lithium-metal composite oxide powder fired at 800 [° C.] or less as a solid body component contains the lithium-metal composite oxide powder at a concentration of 50 [g/L] and has a pH of more than 11.5.

Furthermore, as described above, the unreacted excessive lithium is increased and the lithium is easily eluted from the positive electrode active material itself owing to the deterioration of the crystallinity of the positive electrode active material, so that a problem of soluble lithium is also caused as described below. Meanwhile, when the firing temperature is more than 950 [° C.], there is possibility that sintering may occur vigorously between the lithium-metal composite oxide particles to cause abnormal particle growth.

The lithium mixture may be calcined at 600 to 780 [° C.] before the firing. By the calcination, the reaction in the firing proceeds more gently, so that the unreacted excessive lithium is reduced and the crystallinity is improved in the obtained lithium-metal composite oxide. The retention time at the calcination temperature is preferably 0.5 to 10 hours, and more preferably 2 to 4 hours. The calcination atmosphere may be the atmosphere or an oxidizing atmosphere, and preferably has an oxygen concentration of 18 to 100 [% by volume].

It is not always necessary to cool the lithium mixture to room temperature between the calcination and the subsequent firing (also referred to as main firing), and the main firing may be performed by raising the temperature from the calcination temperature.

<Deagglomeration and Crushing Process (E)>

In the lithium-metal composite oxide powder obtained in the firing process (D), the secondary particles are sometimes aggregated or slightly sintered.

In such a case, the aggregate or the sintered body of the lithium-metal composite oxide powder is preferably subjected to deagglomeration and crushing. As a result, the particle size and the particle size distribution of the obtained lithium-metal composite oxide powder can be adjusted to a suitable range as a positive electrode active material.

As such a deagglomeration and crushing method, known means can be used, and for example, a pin mill, a hammer mill, or the like can be used. In this case, it is preferable to appropriately adjust the deagglomeration and crushing force to such an extent that the secondary particles are not destroyed.

The particle size such as the maximum particle size or the average particle size and the particle size distribution are required to be measured using a laser diffraction/scattering type particle size distribution measuring device in the same manner as in the pulverizing process (p).

<Positive Electrode Active Material for Non-Aqueous Electrolyte Secondary Batteries>

The positive electrode active material for non-aqueous electrolyte secondary batteries, according to the present embodiment, is a lithium-metal composite oxide powder including a secondary particle configured by aggregating primary particles containing lithium, nickel, manganese, and cobalt, or a lithium-metal composite oxide powder including both the primary particles and the secondary particle, wherein a mixed slurry being a mixture of water and the lithium-metal composite oxide powder as a solid body component has a pH of 11.5 or less at a time when the mixed slurry contains the lithium-metal composite oxide powder at a concentration of 50 [g/L], the lithium-metal composite oxide powder contains soluble lithium at a content rate of 0.5 [% by mass] or less, the lithium-metal composite oxide powder has a specific surface area of 2.0 to 3.0 [m$^2$/g], and the secondary particle has a porosity of 20 to 50 [%]. The component composition of the lithium-metal composite oxide powder is preferably represented by a general formula: $Li_a(Ni_{1-w-x}Mn_wCo_x)_{1-y}M_yO_2$: (0.98≤a≤1.20, 0.01≤w≤0.50, 0.01≤x≤0.50, 0.01≤y≤0.10 wherein M is one or more of Mg, Al, Ti, Fe, Cu, Si, Zn, and Mo).

Furthermore, in a non-aqueous electrolyte secondary battery including a positive electrode including the positive electrode active material for non-aqueous electrolyte secondary batteries according to the above-mentioned embodiment, "$\Delta V_{-20\ [°C.]}$ determined by a current rest method at −20 [° C.]" is 0.55 [V] or less.

<Internal Structure of Lithium-Metal Composite Oxide Powder>

The lithium-metal composite oxide in the present embodiment has a hollow structure inside the secondary particle. The positive electrode active material including the lithium-metal composite oxide powder having a hollow structure has an excellent output characteristic due to an increase in the contact area with an electrolyte solution. The lithium-metal composite oxide in the present embodiment has good particle strength despite having a hollow structure.

Figure 5:
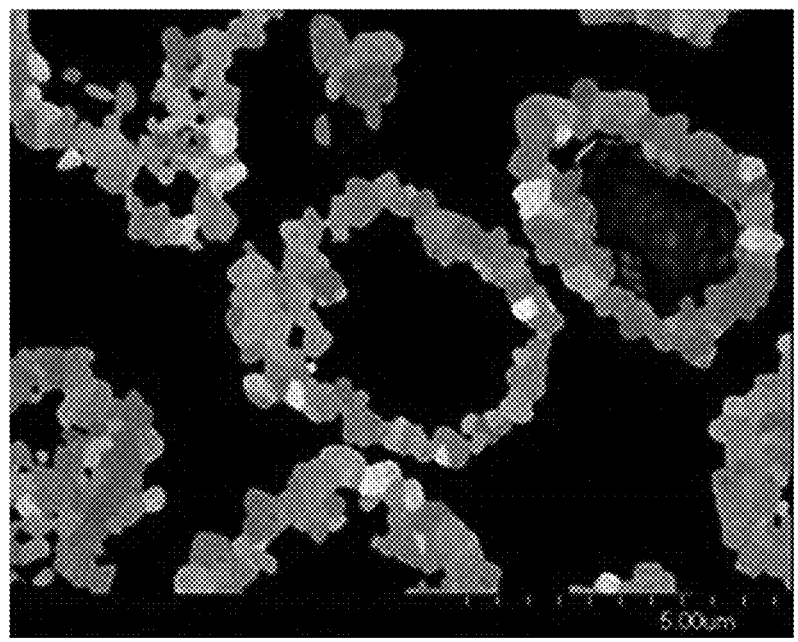
FIG. 5 is an example of a cross sectional SEM image showing that the internal structure of a lithium-metal composite oxide particles according to the present embodiment is a hollow structure.

The term "having a hollow structure inside the secondary particle" refers to having a structure that includes a hollow part including a space present in the center of the secondary particle, and an outer shell section outside the hollow part. The hollow structure can be confirmed by observing a cross section of the lithium-metal composite oxide powder with a scanning electron microscope as shown in FIG. 5.

The lithium-metal composite oxide having a hollow structure preferably has a porosity of 10 to 90 [%], and more preferably 20 to 50 [%] as measured by observing the cross section of the particles. As a result, the contact area of the positive electrode active material with the electrolyte solution can be sufficient while the particle strength is maintained within an allowable range without excessively reducing the bulk density of the obtained positive electrode active material.

In the present embodiment, the secondary particle has a hollow structure and is not limited to such a particle. It is possible to mix secondary particles having a hollow structure, a solid structure, and a porous structure in combination. For example, at the time of mixing and firing a metal hydroxide serving as a source of a transition metal such as nickel, manganese, or cobalt, it is also possible to mix a metal hydroxide having a solid structure, a hollow structure, or a porous structure in combination or at a ratio by adjusting the crystallization condition in the manufacturing process and the like, and the lithium-metal composite oxide obtained in such a manner has an advantage in the overall composition and the particle size stabler than those of a lithium-metal composite oxide prepared by simply mixing a solid product, a hollow product, and a porous product.

<Method for Evaluating Positive Electrode Active Material>

[Slurry pH]

The term "slurry pH" refers to the pH of a mixed slurry being a mixture of water and the lithium-metal composite oxide powder as a solid body component at a time when the mixed slurry contains the lithium-metal composite oxide powder at a concentration of 50 [g/L].

To the lithium-metal composite oxide, water (preferably, water such as ion-exchanged water in which impurities are controlled) is added so that the mixed slurry has the above-mentioned concentration, the mixed slurry is maintained to be stirred for 30 minutes, and the pH of the prepared slurry is measured with a pH meter in the state where the slurry is stirred. Here, when the stirring time is more than 30 minutes, carbon dioxide in the atmosphere is actively absorbed from the slurry liquid surface and the pH easily fluctuates, so that such a stirring time is undesirable.

For calibrating the pH meter, three types of standard buffer solutions sold by reagent manufacturers for pH calibration of pH4, pH7, and pH9 are used. For confirmation of the calibration, a standard buffer solution for pH calibration of pH 10 is used as a check sample.

By confirming the slurry pH, the overall quality of the reactivity between the fine powder lithium compound and the metal hydroxide particles can be known.

The upper limit of the slurry pH is preferably 11.5 or less, more preferably 11.3 or less, and particularly preferably 11.1 or less. The lower limit of the slurry pH is preferably 10.5 or more, more preferably 10.7 or more, and particularly preferably 10.9 or more.

When the slurry pH is more than 11.5, it is considered that unreacted excessive lithium is increased owing to the insufficient mixing in the mixing process (C) and the reduced reactivity in the firing process (D), and when the slurry pH is less than 10.5, it is considered that in the mixing process (C), the supply amount of the fine powder lithium compound is insufficient with respect to the supply amount of the metal hydroxide powder.

[Soluble Lithium]

To the lithium-metal composite oxide, water (preferably, pure water such as ion-exchanged water in which impurities are controlled) is added so that the mixture contains the lithium-metal composite oxide at a concentration of 20 [g/L], the mixture is stirred for 10 minutes and then filtered, and the lithium contained in the filtrate is measured by an ICP optical emission spectrometer. Here, the elemental analyzer used for the measurement is not particularly limited as long as lithium is directly measured with the analyzer. Examples other than the ICP optical emission spectrometer include an atomic absorption spectrometer, a flameless atomic absorption spectrometer, a microwave plasma atomic emission spectrometer, and an ion chromatograph.

As a method for evaluating excessive lithium, a neutralization titration method is generally used. In the method, excessive lithium has a form of lithium hydroxide (LiOH) or lithium carbonate ($Li_2CO_3$). That is, hydroxide ions ($OH^-$) and carbonate ions ($CO_3^{2-}$) that are anions corresponding to lithium ions (Lit) are titrated with a hydrochloric acid standard solution to indirectly analyze the lithium.

In general, on the surface (or the crystal grain boundary) of the lithium-metal composite oxide after firing, excessive lithium remains in the form of lithium hydroxide (LiOH), lithium carbonate ($Li_2CO_3$), lithium sulfate ($Li_2SO_4$), and the like, and these excessive lithium compounds are eluted by water washing. When the reaction between the lithium compound and the metal composite hydroxide is insufficient or when excessive washing is performed, the lithium is easily eluted from the crystal lattice.

Therefore, the neutralization titration method cannot be applied to the detection of lithium having another form such as lithium eluted from the positive electrode active material itself owing to the deterioration of the crystallinity of the positive electrode active material that is the lithium-metal composite oxide.

Therefore, in order to accurately evaluate soluble lithium that is the total lithium amount dissolved in water, electrolyte solution, and the like, as well as the excessive lithium compound remaining on the surface of the positive electrode active material, it is necessary to use the elemental analyzer with which lithium can be directly measured. Furthermore, since there is no need to separate and quantify lithium hydroxide (LiOH) and lithium carbonate ($Li_2CO_3$) in the evaluation of the soluble lithium, it is necessary to avoid applying the neutralization titration method that is an indirect analysis method in order to improve the accuracy and the precision of the analysis.

The soluble lithium content measured by the above-mentioned method for evaluating is represented by a formula of "{(measured value by elemental analyzer [g/L])× (slurry volume [L])/(slurry solid body component [g])}×100 [% by mass]", and is preferably 0.5 [% by mass] or less, more preferably 0.4 [% by mass] or less, and particularly preferably 0.3 [% by mass] or less. It is particularly preferable that lithium should not be detected, so that the lower limit of analysis (quantitation) of the soluble lithium content is about 0.0005 [% by mass] when the condition for preparing the filtrate and the detection limit of the elemental analyzer are considered.

If the slurry pH is less than 10.5 while the soluble lithium content is less than the analysis lower limit of 0.0005 [% by mass], it is considered that the addition amount of the fine powder lithium compound is insufficient with respect to the addition amount of the metal hydroxide powder in the mixing process (C).

[Specific Surface Area]

The specific surface area can be evaluated with the BET specific surface area determined by the nitrogen gas adsorption method based on the BET equation.

The specific surface area of the lithium-metal composite oxide is preferably 2.0 to 3.0 [$m^2$/g]. When the specific surface area is less than 2.0 [$m^2$/g], a sufficient reaction area with lithium cannot be ensured. When the specific surface area is more than 3.0 [$m^2$/g], the filling property is deteriorated.

As described above, it is necessary that the "slurry pH", the "soluble lithium", and the "specific surface area" are within the preferred ranges in order to obtain a high-performance positive electrode active material that does not cause a problem of gelation during the preparation of the positive electrode mixture paste using the positive electrode active material including the obtained metal composite oxide powder.

[Porosity]

The porosity can be measured by observing an arbitrary cross section of the lithium-metal composite oxide particles with a scanning electron microscope, and performing image analysis.

At that time, the evaluation is performed by the following method for evaluating the porosity.

—Method for Evaluating Porosity—

The porosity can be determined by performing the following processes in order: a first process of embedding a lithium-metal composite oxide in a resin; a second process of exposing a cross section of a particle of the lithium-metal composite oxide embedded in the resin by cutting the particle using a cross-section polisher by argon sputtering; a third process of observing the exposed cross section of the particle using a scanning electron microscope; and a fourth process of determining a porosity by analyzing an image of the observed cross section of the particle with image analysis software so that a void of the image is analyzed as a black part and a dense portion is analyzed as a white part and calculating an area ratio of the black part/(the black part+the white part) for the cross section of any 20 or more of the particles.

[Particle Strength]

The particle strength is preferably 80 to 250 MPa, more preferably 130 to 240 MPa, and particularly preferably 150 to 180 MPa, irrespective of the internal structure of the lithium-metal composite oxide powder. When the particle strength is less than 80 MPa, many "cracks" are caused in the lithium-metal composite oxide particles after the charge and discharge, the capacity is sometimes reduced, and the battery is sometimes expanded. When the particle strength is more than 250 MPa, the filling property is deteriorated and in the production of the positive electrode film of the battery, a positive electrode film cannot be sometimes prepared. Furthermore, when a charge and discharge cycle is performed with a positive electrode film having poor filling property, the capacity is greatly reduced, and the cycle characteristic is extremely deteriorated.

The method for evaluating the particle strength is not particularly limited, and the particle strength can be determined, for example, by measuring each particle using a micro compression tester.

<Non-Aqueous Electrolyte Secondary Battery>
[Positive Electrode]

The positive electrode mixture used for forming the positive electrode, and each material included in the positive electrode mixture will be described.

The powdered positive electrode active material according to the present embodiment, a conductive material, and a binding agent are mixed, activated carbon and a solvent for the purpose of adjusting the viscosity are added if necessary, and the resulting mixture is kneaded to prepare a positive electrode mixture paste. The mixing ratio of each material in the positive electrode mixture paste is also an important factor in determining the performance of the lithium secondary battery.

The mixing ratio of each material in the positive electrode mixture paste is not particularly limited, and in the same manner as in the positive electrode of a general lithium secondary battery, the positive electrode mixture paste preferably contains 60 to 95 [% by mass] of the positive electrode active material, 1 to 20 [% by mass] of the conductive material, and 1 to 20 [% by mass] of the binding agent based on 100 [% by mass] of the total solid components in the positive electrode mixture paste excluding the solvent.

Furthermore, the viscosity of the positive electrode mixture paste can be measured using a vibrating viscometer.

In the measurement using the vibrating viscometer, a vibrator in a fluid is resonated at a constant amplitude and frequency to measure the viscosity using the correlation between the vibrating force to move the vibrator and the viscous resistance of the fluid, and it is possible to measure viscosity as high as 10,000 [mPa·s].

In the present embodiment, 10 g or more of the positive electrode mixture paste mixed so that the solid component [g]/the solvent [g]=1.875 for confirming the viscosity was put in a predetermined container, and the fluid temperature was adjusted to 20° C. in a water bath to measure the viscosity. The calibration of the vibrating viscometer is preferably two-point calibration in which JS-200 (viscosity at 20 [° C.]: 170 [mPa·s]) and JS-2000 (viscosity at 20 [° C.]: 1800 [mPa·s]) are used as standard solutions for calibration of a viscometer that are specified in JIS-Z-8809. The above-mentioned ratio "1.875" represents a solid-liquid ratio in the positive electrode mixture paste used for preparing a positive electrode that provides a favorable characteristic to a secondary battery as in a case according to the present embodiment.

The obtained positive electrode mixture paste is applied to, for example, the surface of an aluminum foil current collector, and dried to evaporate the solvent. If necessary, the positive electrode mixture paste is pressed with a roll press or the like to increase the electrode density. A sheet-shaped positive electrode can be prepared in such a manner. The prepared sheet-shaped positive electrode is subjected to processing such as cutting into an appropriate size in accordance with a target battery, and can be used for preparing the battery. The method for preparing the positive electrode is not limited to the above-described example, and may be another method.

Examples of the conductive material used for preparing the positive electrode include graphite (natural graphite, artificial graphite, expanded graphite, and the like) and carbon black-based materials such as acetylene black and Ketjen black.

The binding agent (binder) plays a role of binding active material particles, and examples of the binding agent include polyvinylidene fluoride (PVDF), fluorine-containing resins such as polytetrafluoroethylene, ethylene propylene diene rubber, and fluorine rubber, and thermoplastic resins such as styrene-butadiene, cellulose-based resins, polyacrylic acid, polypropylene, and polyethylene. If necessary, a solvent that disperses the positive electrode active material, the conductive material, and the activated carbon, and dissolves the binding agent is added to the positive electrode mixture.

As the solvent, specifically, an organic solvent such as N-methyl-2-pyrrolidone (NMP) can be used.

To the positive electrode mixture, activated carbon can be added in order to increase the capacity of the electric double layer.

[Negative Electrode]

The used negative electrode is produced in such a way that a binding agent is mixed and a suitable solvent is added to a negative electrode active material that can absorb and desorb metallic lithium, lithium alloys, and a lithium ion to form a paste-like mixture, the resulting negative electrode mixture paste is applied to the surface of a metal foil current collector such as copper, dried, and, if necessary, compressed and formed to increase the electrode density.

Examples of the negative electrode active material include natural graphite, artificial graphite, organic compound fired bodies such as a phenol resin, and powdered carbon materials such as coke. In this case, as the negative electrode binding agent, a fluorine-containing resin such as polyvinylidene fluoride (PVDF) can be used in the same manner as in the positive electrode, and as the solvent that disperses the active material and the binding agent, an organic solvent such as N-methyl-2-pyrrolidone (NMP) can be used.

[Separator]

A separator is interposed between the positive electrode and the negative electrode. The separator separates the positive electrode and the negative electrode and retains the electrolyte, and may be a thin film of polyethylene, polypropylene, or the like having many fine holes.

[Non-Aqueous Electrolyte Solution]

The non-aqueous electrolyte solution is produced by dissolving a lithium salt as a supporting salt in an organic solvent. As the organic solvent, one can be used alone or two or more can be mixed and used selected from cyclic carbonates such as ethylene carbonate (EC), propylene carbonate (PC), butylene carbonate (BC), and trifluoropropylene carbonate (TFPC), chain carbonates such as diethyl carbonate (DEC), dimethyl carbonate (DMC), ethyl methyl carbonate (EMC), and dipropyl carbonate (DPC), ether compounds such as tetrahydrofuran (THF), 2-methyltetrahydrofuran (2-MeTHF), and dimethoxyethane (DME), sulfur compounds such as ethyl methyl sulfone and butanesultone, and phosphorus compounds such as triethyl phosphate and trioctyl phosphate.

As the supporting salt, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide ($LiN(CF_3SO_2)_2$), or the like, or a composite salt thereof can be used.

Furthermore, the non-aqueous electrolyte solution may contain a radical scavenger, a surfactant, a flame retardant, and the like.

[Shape and Configuration of Battery]

The lithium ion secondary battery according to the present embodiment, the lithium ion secondary battery including the positive electrode, the negative electrode, the separator, and the non-aqueous electrolyte solution described above can have various shapes such as a cylindrical shape and a stacked shape.

Whichever the lithium ion secondary battery has, the positive electrode and the negative electrode are stacked with the separator interposed therebetween to form an electrode body, and the electrode body is impregnated with the non-aqueous electrolyte solution. The positive electrode collector is connected with a positive electrode terminal leading to the outside, and the negative electrode collector is connected with a negative electrode terminal leading to the outside via a current collecting lead or the like.

The lithium ion secondary battery having the above-mentioned configuration is enclosed in a battery case and the battery can be completed.

EXAMPLES

Hereinafter, the present invention will be described in more detail by examples and comparative examples, but the present invention is not limited to the examples.

Example 1

[Metal Composite Hydroxide]
a) Manufacturing of Metal Composite Hydroxide Powder
[Preparing Process (a) of Metal Composite Hydroxide]

First, nickel sulfate hexahydrate, cobalt sulfate heptahydrate, and manganese sulfate monohydrate were dissolved in water so that the molar ratio of nickel, manganese, and cobalt was Ni:Mn:Co=35:30:35, and the concentration of nickel, manganese, and cobalt was 2 [mol/L] to prepare a raw material solution. In a reaction tank having a volume of 6 [L] up to overflow, 900 [ml] of water was put, the temperature in the reaction tank was raised to 40 [° C.] using a water bath, and the inside of the reaction tank was adjusted to the atmosphere (oxygen concentration: 21 [% by volume]).

Next, the raw material solution, ammonia water of 25 [% by mass], and sodium hydroxide solution of 25 [% by mass] were continuously supplied while the water in the reaction tank was stirred to form a reaction solution. At this time, the sodium hydroxide solution was supplied so that the pH of the reaction solution was 11.7 at a standard liquid temperature of 25 [° C.], and the ammonia water was supplied so that the ammonium ion concentration was maintained at 10.0 [g/L], so that the reaction solution was prepared.

In the state, crystallization treatment was performed for 0.5 hour, then the supply of the raw material solution, the ammonia water, and the sodium hydroxide solution was temporarily stopped, a nitrogen gas was introduced at a flow rate of 5 [L/min] and replaced the atmosphere until the oxygen concentration inside the reaction tank was 0.2 [% by volume] or less, the liquid supply was restarted after a non-oxidizing atmosphere having an oxygen concentration of 0.2 [% by volume] or less was obtained, and the crystallization treatment was continued for 3.5 hours.

Then, the slurry after the crystallization treatment was subjected to solid-liquid separation to obtain a nickel-manganese-cobalt composite hydroxide $Ni_{0.35}Mn_{0.30}Co_{0.35}(OH)_2$ having a hollow structure.

The pH and the ammonium ion concentration of the reaction solution were measured using Orion-Star-A214 (manufactured by Thermo Fisher Scientific K. K.) that is a pH/ammonia measurement kit (combined pH meter and ammonium ion meter) previously placed in the reaction tank.

b) Washing of Metal Composite Hydroxide Powder

The metal composite hydroxide powder was slurried again with ion-exchanged water so that the slurry concentration was 100 [g/L], a sodium hydroxide solution was added, and the mixture was stirred for 30 minutes to wash the metal composite hydroxide "with an alkali". The slurry washed with an alkali using the sodium hydroxide solution was subjected to solid-liquid separation using a suction filter or the like and then washed "with water" using pure water to perform the "filtration and washing process (A)", and the obtained washed residual material was dried at 120 [° C.] for 24 [hours] using an air dryer to obtain a dry powder of the metal composite hydroxide.

c) Evaluation of Metal Composite Hydroxide Powder

The composition of the metal composite hydroxide powder was measured using a simultaneous ICP optical emission spectrometer, ICPE-9000 (manufactured by SHIMADZU CORPORATION), and as a result, it was confirmed that the composition was represented by a general formula: $Ni_{0.35}Mn_{0.30}Co_{0.35}O$.

[Fine Powder Lithium Compound]

A lithium compound powder as a lithium raw material is pulverized to a predetermined size in the pulverizing process (p). Specifically, lithium carbonate having a maximum particle size of 100 [μm] or more was pulverized using a jet mill (manufactured by, for example, SEISHIN ENTERPRISE Co., Ltd.) until the maximum particle size was 10.0 [μm] or less and the average particle size was 5.0 [μm] or less to prepare a predetermined fine powder lithium compound. For the measurement of the particle size distribution, a laser diffraction/scattering type particle size distribution measuring device, Microtrac MT3300EX2 (manufactured by MicrotracBEL Corp.) was used.

The measurement results of the particle size distribution are shown in Table 1.

[Lithium Mixture]
a) Preparation of Lithium Mixture by Mixing Process (C)

The fine powder lithium compound was weighed to have a ratio to the metal composite hydroxide powder of Li/Me=1.02 and they were mixed to obtain a lithium mixture. For the mixing, a shaker mixer, TURBULA-TypeT2C (manufactured by Willy A. Bachofen AG (WAB)) was used.

b) Calcination and Firing of Lithium Mixture by Firing Process (D)

The lithium mixture was calcined in the air stream at 760 [° C.] for 4 hours, then fired at 900 [° C.] for 10 hours, and cooled to room temperature to obtain lithium-metal composite oxide particles. Since the secondary particles included in the lithium-metal composite oxide after the cooling were aggregated or slightly sintered, the secondary particles were subjected to deagglomeration and crushing to obtain a positive electrode active material.

[Positive Electrode Active Material]

Various characteristics of the manufactured positive electrode active material were evaluated by the method described below. The evaluation results are shown in Table 1.

Slurry pH

For the measurement of the slurry pH, a pH/ion meter, HM-42X (manufactured by DKK-TOA CORPORATION) was used. For the calibration of the electrode, a phthalate pH standard solution (type 2: 4.01), a neutral phosphate pH standard solution (type 2: 6.86), a borate pH standard solution (type 2: 9.18), and a carbonate pH standard solution (type 2: 10.01) that were standard buffer solutions for pH measurement manufactured by Wako Pure Chemical Industries, Ltd. were used.

Soluble Lithium Content Rate

For the measurement of the soluble lithium content rate, a simultaneous ICP optical emission spectrometer, ICPE-9000 (manufactured by SHIMADZU CORPORATION) was used.

Specific Surface Area

The specific surface was measured using a BET specific surface area measuring device of Macsorb 1200 series (manufactured by Mountech Co., Ltd.) employing a fluid type nitrogen gas adsorption method, and calculated by the BET equation.

Porosity

For the cutting of the particles of the lithium-metal composite oxide, a cross-section polisher IB-19530CP (manufactured by JEOL Ltd.) that is a cross-section sample preparation device was used, and for the observation of the cross section, a Schottky field emission scanning electron microscope SEM-EDS, JSM-7001F (manufactured by JEOL Ltd.) was used. Furthermore, by an image analysis and measurement software, WinRoof6.1.1 (manufactured by Mitani Corporation), the void in the particle cross section was measured as a black part and the dense portion of the particle was measured as a white part, and an area ratio of the black part/(the black part+the white part) was calculated for any 20 or more of the particles to determine the porosity.

Particle Strength

The particle strength was determined by applying a load to one NMC particle with an indenter using a micro-strength evaluation tester MCT-500 (manufactured by SHIMADZU CORPORATION) and calculating the particle strength when the particle was broken. Specifically, the NMC particle was held stationary on a silicon plate, the position was finely adjusted in accordance with the center of the indenter, and the indenter was brought into contact with the NMC particle so that a large load was not applied to the NMC particle to perform the measurement. The measurement conditions were set so that the test force was 150 mN and the load rate was 2.0 mN/sec, and the average value of 10 particles was determined.

[Positive Electrode]

For the preparation of a positive electrode, the above-mentioned lithium-metal composite oxide as a positive electrode active material, acetylene black as a conductive material, and PVDF as a binding agent were mixed so that the mass ratio was 85:10:5, then dispersed in a solvent (NMP), and formed into a paste. The positive electrode mixture paste was applied to an aluminum foil (positive electrode collector) having a thickness of 20 [μm] using an applicator so that the mass per unit area of the positive electrode mixture paste was 7 [mg/cm$^2$]. Then, the resulting product was dried at 120 [° C.] for 30 minutes using an air-blow dryer, and then rolled with a load of a linear pressure of 180 [kg/cm] by a roll press to obtain a positive electrode sheet.

The positive electrode sheet was punched into a 3×5 [cm] rectangle with a 10 [mm] wide strip (terminal) protruding from one corner of the sheet, the positive electrode active material layer was removed from the strip, and the aluminum foil was exposed to form a terminal portion, so that a positive electrode sheet with a terminal was obtained.

For the measurement of the viscosity of the positive electrode mixture paste for viscosity confirmation prepared under the above-mentioned conditions, a vibrating viscometer, VISCOMATE VM-100A (manufactured by SEKONIC CORPORATION) was used, and a standard solution manufactured by NIPPON GREASE Co., Ltd. was used as the standard solution for calibration of a viscometer that is specified in JIS-Z-8809 (JS-200, JS-2000).

[Negative Electrode]

For the preparation of a negative electrode, natural graphite powder (manufactured by Mitsubishi Chemical Corporation) as a negative electrode active material and PVDF (binder) as a binding agent were mixed so that the mass ratio was 90:10, then dispersed in a solvent (NMP), and formed into a paste. The paste was applied to a copper current collector (negative electrode collector) having a thickness of 15 [μm] using an applicator so that the paste had the thickness of 3.1 [mg/cm$^2$]. Then, the resulting product was dried at 120 [° C.] for 30 minutes using an air-blow dryer. Furthermore, the dried electrode was rolled under a linear pressure of 390 [kg/cm] using a roll press to obtain a negative electrode sheet.

The prepared negative electrode sheet was cut into a 3.2×5.2 [cm] rectangle with a 10 [mm] wide strip (terminal) protruding from one corner of the sheet, the negative electrode active material layer was removed from the strip, and the copper foil was exposed to form a terminal portion, so that a negative electrode sheet with a terminal was obtained.

[Separator]

As a separator, a polypropylene microporous film separator having a thickness of 20 [μm] generally used in a lithium ion secondary battery was cut into 5.8×3.4 [cm] and used.

[Electrolyte Solution]

For the preparation of an electrolyte solution, ethylene carbonate (EC) and ethyl methyl carbonate (EMC) were mixed at a volume ratio of EC/EMC=3:7 to prepare a mixed solution containing lithium hexafluorophosphate (LiPF$_6$) as a supporting electrolyte at a content of 1 [mol/L], and the mixed solution was used as an electrolyte solution.

[Assembly]

Figure 4:
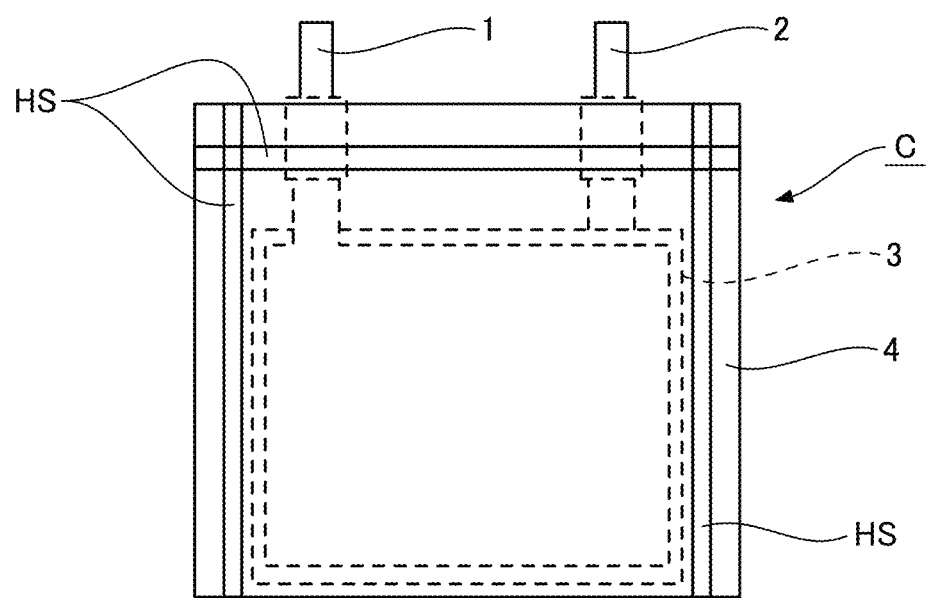
FIG. 4 is a view showing an example of a laminate cell prepared for evaluation of a low-temperature output characteristic according to Examples.

Above-mentioned materials were dried under reduced pressure at 80 [° C.] for 8 hours, then brought into a dry room in which the dew point was less than −60 [° C.], and assembled into a single-layer laminate cell battery having an exterior size of 80×60 [mm] shown in FIG. 4. FIG. 4 shows a single-layer laminate cell battery C used in the present example in which a positive electrode sheet is represented by 1, a negative electrode sheet is represented by 2, a separator is represented by 3, an aluminum laminate sheet is represented by 4, and a heat-sealed portion is represented by HS.

[Conditioning Process]

The battery was held in a thermostat controlled at 25 [° C.] with a load of 0.4 [kgf/cm$^2$] applied to the electrode portion, kept for 12 hours, and then charged to 4.2 [V] at a rate of 0.2 [C] (a current value for full charge in 5 hours) and discharged to 3.0 [V] at a rate of 0.2 [C] using charge and discharge test device HJ1001SD8 (manufactured by HOKUTO DENKO CORPORATION) with a rest time of 10 minutes after the charge and discharge.

[Lithium Ion Secondary Battery]

—Evaluation of Low-Temperature Output Characteristic—

Using the laminate cell for evaluation shown in FIG. 4, the internal resistance of the battery at a low temperature (−20 [° C.]) $\Delta V_{-20\ [°\ C.]}$ was measured by a current rest method to evaluate the low-temperature output characteristic. The method for evaluation is shown below.

The laminate cell for evaluation is prepared as shown below.

The positive electrode active material, the conductive material (acetylene black), and the binding agent (PVDF) are mixed so that the mass ratio is 85:10:5, then the solvent (NMP) was added to form a paste, the paste was applied to the aluminum current collecting foil (thickness 0.02 [mm]) excluding the conductive portion connected to the outside, and the resulting product was dried to prepare a positive electrode sheet 1 in which a positive electrode active material layer is formed having a weight per unit area of the positive electrode active material of 7 [mg/cm$^2$].

Furthermore, natural graphite powder as the negative electrode active material and the binding agent (PVDF) are mixed so that the mass ratio is 90:10, then dispersed in the solvent (NMP) to form a paste, and the paste was applied to the copper current collecting foil (thickness 0.02 [mm]) to prepare a negative electrode sheet 2 in which a negative electrode active material layer is formed having a weight per unit area of the negative electrode active material of 5 [mg/cm$^2$].

Between the prepared positive electrode sheet 1 and the negative electrode sheet 2, a separator 3 including the polypropylene microporous film (thickness 20.7 [μm], porosity density 43.9 [%]) was interposed to form a laminate sheet, the laminate sheet was sandwiched between two aluminum laminate sheets 4 (thickness 0.55 [mm]), and the three sides of the aluminum laminate sheets 4 are heat-sealed to form a heat-sealed portion HS, so that the aluminum laminate sheets 4 were sealed and assembled into a laminate cell having a configuration as shown in FIG. 4.

Then, after injecting 260 [μl] of an electrolyte solution manufactured by Ube Industries, Ltd. in which lithium hexafluorophosphate (LiPF$_6$) was dissolved at a content of 1 [mol/L] in a mixed solvent of ethylene carbonate, ethyl methyl carbonate, and dimethyl carbonate (volume ratio 3:3:4), the remaining one side was heat-sealed to prepare an assembled laminate cell shown in FIG. 4.

The prepared laminate cell was charged to 4.2 [V] at a temperature of −20 [° C.] and then discharged to 2.5 [V] at 0.2 [C], the voltage was relaxed in an open circuit for 600 seconds, and the voltage change before and after relaxing the voltage ($\Delta V_{-20\ [°C.]}$) was calculated. When the current is constant during the discharge, the obtained voltage change ($\Delta V_{-20\ [°C.]}$) can be regarded as the resistance change. That is, the smaller $\Delta V_{-20\ [°C.]}$ is, the lower the "battery resistance" can be regarded as, so that the value of $\Delta V$-20 [° C.] was used as an index of the DC resistance under a low temperature condition to evaluate the "low-temperature output characteristic" of the secondary battery in the present example.

The evaluation results are shown in Table 1.

Example 2

A positive electrode active material was obtained in the same manner as in Example 1 except that the lithium carbonate was pulverized using a jet mill until the lithium carbonate had the particle size distribution of a maximum particle size of 8.0 [μm] or less and an average particle size of 4.0 [μm] or less to perform evaluation.

The evaluation results are shown in Table 1.

Example 3

A positive electrode active material was obtained in the same manner as in Example 1 except that the lithium carbonate was pulverized using a jet mill until the lithium carbonate had the particle size distribution of a maximum particle size of 4.1 [μm] or less and an average particle size of 2.5 [μm] or less to perform evaluation.

The evaluation results are shown in Table 1.

Example 4

A positive electrode active material was obtained in the same manner as in Example 1 except that the lithium carbonate was pulverized using a jet mill until the lithium carbonate had the particle size distribution of a maximum particle size of 4.0 [μm] or less and an average particle size of 2.0 [μm] or less to perform evaluation.

The evaluation results are shown in Table 1.

Comparative Example 1

A positive electrode active material was obtained in the same manner as in Example 1 except that the lithium carbonate was not pulverized and had the particle size distribution of a maximum particle size of 110 [μm] and an average particle size of 53 [μm] to perform evaluation.

The evaluation results are shown in Table 1.

Comparative Example 2

A positive electrode active material was obtained in the same manner as in Example 1 except that the lithium carbonate was not pulverized and had the particle size distribution of a maximum particle size of 120 [μm] and an average particle size of 65 [μm] to perform evaluation.

The evaluation results are shown in Table 1.

TABLE 1

| | Positive electrode active material | | | | Lithium ion secondary battery | Lithium compound (lithium carbonate) | | | | | |
|---|---|---|---|---|---|---|---|---|---|---|---|
| | | | | | | Pulverizing | | | | Positive electrode mixture paste | |
| | Slurry pH | Soluble lithium [% by weight] | Specific surface area [m$^2$/g] | Porosity [%] | Particle strength (mPa) | Current rest method $\Delta V_{-20[°C.]}$ | Maximum particle size [μm] | Average particle size [μm] | Maximum particle size [μm] | Average particle size [μm] | Viscosity [mPa·s] | Gelation |
| Example 1 | 11.5 | 0.46 | 2.04 | 25 | 179 | 0.54 | 110 | 53 | 9.8 | 4.7 | 5000 | Not caused |
| Example 2 | 11.4 | 0.43 | 2.22 | 34 | 170 | 0.52 | 110 | 53 | 7.8 | 3.9 | 4600 | Not caused |
| Example 3 | 11.3 | 0.22 | 2.69 | 43 | 163 | 0.49 | 110 | 53 | 4.1 | 2.3 | 3500 | Not caused |
| Example 4 | 11.0 | 0.05 | 2.97 | 47 | 151 | 0.48 | 110 | 53 | 3.6 | 1.5 | 1800 | Not caused |

TABLE 1-continued

| | | Positive electrode active material | | | Lithium ion secondary battery | Lithium compound (lithium carbonate) | | | | Positive electrode mixture paste | |
| | | | | | | | | Pulverizing | | | |
| | Slurry pH | Soluble lithium [% by weight] | Specific surface area [m²/g] | Porosity [%] | Particle strength (mPa) | Current rest method $\Delta V_{-20[°C.]}$ | Maximum particle size [μm] | Average particle size [μm] | Maximum particle size [μm] | Average particle size [μm] | Viscosity [mPa·s] | Gelation |
|---|---|---|---|---|---|---|---|---|---|---|---|---|
| Comparative Example 1 | 11.8 | 0.52 | 1.85 | 9 | — | 0.57 | 110 | 53 | Not pulverized | Not pulverized | 7500 | Caused |
| Comparative Example 2 | 12.1 | 0.61 | 1.78 | 6 | — | 0.61 | 120 | 65 | Not pulverized | Not pulverized | 9100 | Caused |

[Comprehensive Evaluation]

The positive electrode active materials in Examples 1 to 4 had the effect of improving the reactivity in the calcination and main firing process by use of the fine powder lithium compound prepared by pulverizing the lithium compound (lithium carbonate) as a lithium raw material having a maximum particle size of 100 [μm] or more, and the slurry pH, the soluble lithium content, the specific surface area, the porosity, and the particle strength were all within the preferable ranges. Furthermore, gelation was not caused during the preparation of the positive electrode mixture paste, and the positive electrode mixture paste had a viscosity of 5,000 [mPa·s] or less at a ratio of the solid component [g]/the solvent [g]=1.875 at 20 [° C.].

In a lithium ion secondary battery incorporating the positive electrode active material, the $\Delta V_{-20\,[°C.]}$ determined by a current rest method was low at −20 [° C.], so that it was confirmed that the lithium ion secondary battery having an excellent characteristic was obtained by use of the above-mentioned materials.

In addition, it is considered that the specific surface area was increased because during the reaction between the lithium compound (lithium carbonate) and the metal composite hydroxide, the fine powder lithium compound was interposed in the grain boundary portion of the metal composite hydroxide and the grain growth of the positive electrode active material was hindered. It is presumed that the contact area of the particle surface of the positive electrode active material was increased to make lithium extraction/insertion easy, and the low-temperature output characteristic was improved.

On the other hand, in the positive electrode active materials in Comparative Examples 1 and 2, gelation was slightly caused during the preparation of the positive electrode mixture paste, and the viscosity of the positive electrode mixture paste and the ΔV determined by a current rest method at −20 [° C.] in a lithium ion secondary battery incorporating the positive electrode active material were unsatisfactory. It is considered that the reason is that the unreacted excessive lithium was increased and the crystallinity of the positive electrode active material was deteriorated because of the reduced reactivity due to the lithium compound (lithium carbonate) calcinated and mainly fired without pulverizing.

From the above results, the non-aqueous electrolyte secondary battery using the positive electrode active material of the present example has an excellent low-temperature output characteristic and the like, so that it is possible to realize a non-aqueous secondary battery from which high output can be extracted regardless of use environment.

The non-aqueous electrolyte secondary battery according to the present invention is suitable as a power source for devices expected to be used in various environments such as electric cars and hybrid vehicles, and thus has a very large industrial applicability.

REFERENCE SIGNS LIST

1 Positive electrode sheet
2 Negative electrode sheet
3 Separator
4 Aluminum laminate sheet
11 Composite hydroxide particles
12 Primary particles
13 Secondary particle
14 Void
C Single-layer laminate cell battery
d Particle size
HS Heat-sealed portion

The invention claimed is:

1. A method for manufacturing a positive electrode active material for non-aqueous electrolyte secondary batteries, the method comprising:
   a filtration and washing process (A) of washing a metal composite hydroxide with water, or with an alkali and then with water, and collecting a residual material of the metal composite hydroxide by a solid-liquid separation;
   a drying process (B) of obtaining a dried material of the metal composite hydroxide by drying the residual material;
   a mixing process (C) of forming a mixture of the dried material and a fine powder lithium compound having a maximum particle size of 10 μm or less; and
   a firing process (D) of forming a positive electrode active material for non-aqueous electrolyte secondary batteries, the positive electrode active material including a lithium-metal composite oxide as a fired body by firing the mixture, wherein
   a lithium-metal composite oxide powder is manufactured with the metal composite hydroxide containing nickel, manganese, and cobalt and the fine powder lithium compound having a maximum particle size of 10 μm or less as raw materials using a manufacturing process including the processes (A) to (D) in order described above,
   the lithium-metal composite oxide powder includes a secondary particle configured by aggregating primary particles containing lithium, nickel, manganese, and cobalt or includes both the primary particles and the secondary particle, the secondary particle has a hollow structure inside as a main inside structure, the lithium-metal composite oxide powder has a porosity of 20 to 50%, a slurry has a pH of 11.5 or less at a time when a slurry concentration is 50 g/L, the lithium-metal composite oxide powder contains 0.5% by mass of soluble lithium, and the lithium-metal composite oxide powder has a specific surface area of 2.0 to 3.0 m$^2$/g.

2. The method for manufacturing a positive electrode active material for non-aqueous electrolyte secondary batteries, according to claim 1, wherein the metal composite hydroxide is produced by a preparing process (a) described below, and the metal composite hydroxide has a coarse density of 20 to 50%:

a preparing process (a) for producing a metal composite hydroxide, the preparing process of stirring water having a water surface in an oxidizing atmosphere and having a maintained temperature of 40 to 60° C.; forming a reaction solution by adding a nickel-manganese-cobalt mixed solution, ammonia water, and an alkaline solution to the water while the water is stirred;

performing a crystallization treatment in a state where the reaction solution has a maintained pH of 11.0 to 12.5;

performing a crystallization treatment in the reaction solution having a liquid surface in an inert atmosphere or in a non-oxidizing atmosphere having a controlled oxygen concentration of 0.2% by volume or less; and crystallizing a metal composite hydroxide having a controlled coarse density of 20 to 50%.

3. The method for manufacturing a positive electrode active material for non-aqueous electrolyte secondary batteries, according to claim 2, wherein the fine powder lithium compound has a maximum particle size of 10 μm or less and an average particle size of 5.0 μm or less, and the fine powder lithium compound is formed using a pulverizing process (p) described below:

a pulverizing process (p) of producing a fine powder lithium compound having a maximum particle size of 10 μm or less and an average particle size of 5.0 μm or less by pulverizing a lithium compound powder being a lithium raw material having a maximum particle size of 100 μm or more and an average particle size of 50 μm or more.

4. The method for manufacturing a positive electrode active material for non-aqueous electrolyte secondary batteries, according to claim 3, wherein the lithium raw material is lithium carbonate, lithium hydroxide, or a mixture of the lithium carbonate and the lithium hydroxide.

5. The method for manufacturing a positive electrode active material for non-aqueous electrolyte secondary batteries, according to claim 2, wherein the lithium-metal composite oxide powder is represented by a general formula: $Li_a(Ni_{1-w-x}Mn_wCo_x)_{1-y}M_yO_2$, wherein $0.98 \leq a \leq 1.20$, $0.01 \leq w \leq 0.50$, $0.01 \leq x \leq 0.50$, and $0.01 \leq y \leq 0.10$, and wherein M is one or more of Mg, Al, Ti, Fe, Cu, Si, Zn, or Mo.

6. The method for manufacturing a positive electrode active material for non-aqueous electrolyte secondary batteries, according to claim 1, wherein the fine powder lithium compound has a maximum particle size of 10 μm or less and an average particle size of 5.0 μm or less, and the fine powder lithium compound is formed using a pulverizing process (p) described below:

a pulverizing process (p) of producing a fine powder lithium compound having a maximum particle size of 10 μm or less and an average particle size of 5.0 μm or less by pulverizing a lithium compound powder being a lithium raw material having a maximum particle size of 100 μm or more and an average particle size of 50 μm or more.

7. The method for manufacturing a positive electrode active material for non-aqueous electrolyte secondary batteries, according to claim 6, wherein the lithium raw material is lithium carbonate, lithium hydroxide, or a mixture of the lithium carbonate and the lithium hydroxide.

8. The method for manufacturing a positive electrode active material for non-aqueous electrolyte secondary batteries, according to claim 7, wherein the lithium-metal composite oxide powder is represented by a general formula: $Li_a(Ni_{1-w-x}Mn_wCo_x)_{1-y}M_yO_2$, wherein $0.98 \leq a \leq 1.20$, $0.01 \leq w \leq 0.50$, $0.01 \leq x \leq 0.50$, and $0.01 \leq y \leq 0.10$, and wherein M is one or more of Mg, Al, Ti, Fe, Cu, Si, Zn, or Mo.

9. The method for manufacturing a positive electrode active material for non-aqueous electrolyte secondary batteries, according to claim 1, wherein the lithium-metal composite oxide powder is represented by a general formula: $Li_a(Ni_{1-w-x}Mn_wCo_x)_{1-y}M_yO_2$, wherein $0.98 \leq a \leq 1.20$, $0.01 \leq w \leq 0.50$, $0.01 \leq x \leq 0.50$, and $0.01 \leq y \leq 0.10$, and wherein M is one or more of Mg, Al, Ti, Fe, Cu, Si, Zn, or Mo.

* * * * *